A. S. SPIEGEL.

ADVERTISING APPARATUS.

APPLICATION FILED MAR. 20, 1909.

Reissued May 3, 1910.

13,109.

2 SHEETS—SHEET 1.

ATTEST.

Bert. McStahl.

Edward N. Sarton

INVENTOR.

ALEXANDER S. SPIEGEL,

By Spear, Middleton, Donaldson & Spear

ATTYS.

A. S. SPIEGEL.

ADVERTISING APPARATUS.

APPLICATION FILED MAR. 20, 1909.

Reissued May 3, 1910.

13,109.

2 SHEETS—SHEET 2.

ATTEST.

Benth. Stahl.

Edward N. Sutro

INVENTOR.

ALEXANDER S. SPIEGEL.

By Spear, Middleton, Donaldson & Spear

ATTY'S.

UNITED STATES PATENT OFFICE.

ALEXANDER S. SPIEGEL, OF CHICAGO, ILLINOIS, ASSIGNOR TO THE ATTRACTOGRAPH COMPANY, OF CHICAGO, ILLINOIS, A CORPORATION.

ADVERTISING APPARATUS.

13,109. Specification of Reissued Letters Patent. Reissued May 3, 1910.

Original No. 911,561, dated February 2, 1909, Serial No. 424,860. Application for reissue filed March 20, 1909. Serial No. 484,832.

*To all whom it may concern:*

Be it known that I, ALEXANDER S. SPIEGEL, a citizen of the United States, and a resident of Chicago, in the county of Cook and State of Illinois, have invented certain new and useful Improvements in Advertising Apparatus, of which the following, when taken in connection with the drawings accompanying and forming a part hereof, is a full and complete description, sufficient to enable those skilled in the art to which it pertains to understand, make, and use the same.

The invention relates to those devices wherein advertisements comprising a plurality of designs, or a plurality of advertisements, continuously appear and disappear. And the object of this invention is to obtain a device wherein, not only will there continuously, and in rotation, appear and disappear advertisements or designs; but in addition thereto there will appear a background of many colors, which colors, at any given point on the background, will constantly change, thereby producing a dissolving or melting effect, which is apparently independent of the change in advertisements or designs.

A further object of the invention is to obtain a device of the character described which, in its initial cost, will not be expensive, and which will not be expensive to maintain in operation.

A further object of this invention is to obtain a device of the character described, wherein the many changes in appearance of the colors in the background are made without betraying to an observer the means by which the same are obtained.

A further object of this invention is to obtain a device wherein the same advertisement or design will for a given time be exposed to view to all observers of the device or to one observer who may change his position relative to the device during such time.

Figure 1:
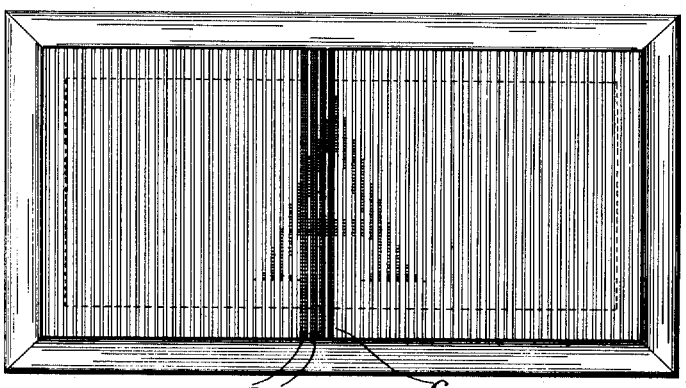
Figure 2:
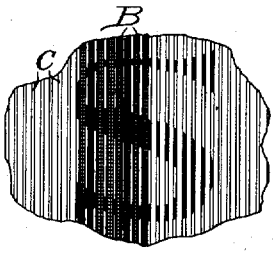
Figure 8:
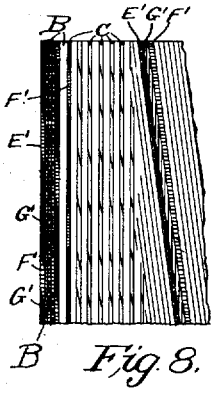
Figure 9:
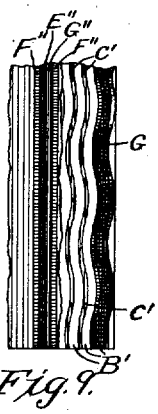
Figure 3:
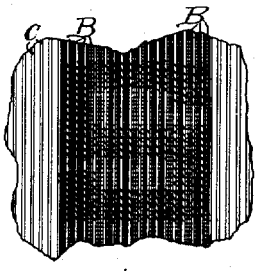
Figure 4:
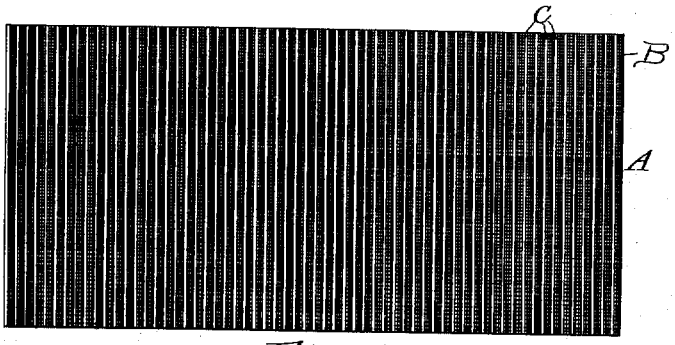
Figure 5:
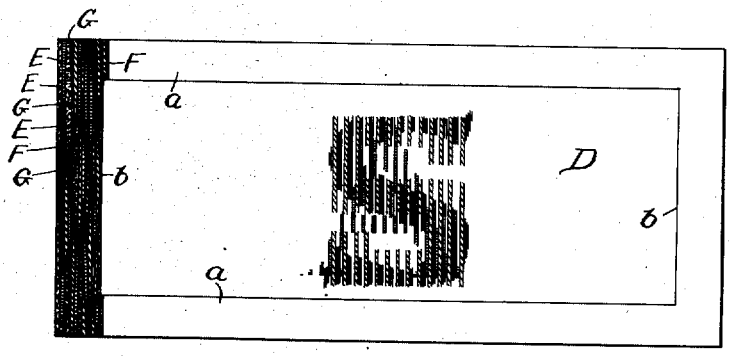
Figure 7:
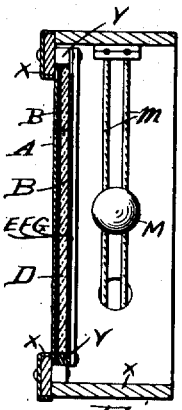
Figure 6:
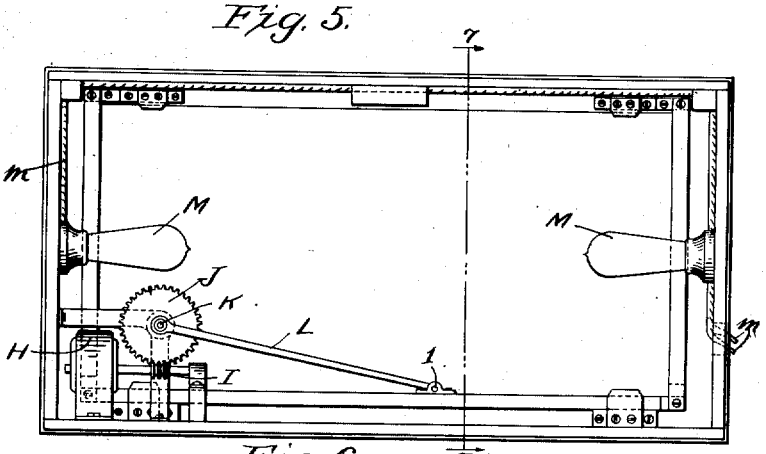

In the drawings referred to as forming a part hereof:—Figure 1 is a front elevation of a device embodying this invention, as the same appears at a given moment. Fig. 2 is a front elevation of a portion of the device embodying this invention as the same appears at a different moment. Fig. 3 is a front elevation of a portion of the device embodying this invention as the same appears at a still different moment. Fig. 4 is a front elevation of the screen forming an element of the device. Fig. 5 is a front elevation of the movable plate of the device. Fig. 6 is a rear elevation of an advertising apparatus embodying this invention with the back removed to expose the operative parts to view. Fig. 7 is a vertical sectional view on line 7—7 of Fig. 6, viewed in the direction indicated by the arrows. Fig. 8 is a front elevation of a portion of the immovable plate of the device and of a modification of the movable plate thereof, and Fig. 9 is an elevation of a portion of a modification of the immovable plate of the device and of a portion of the movable plate thereof.

In Figs. 1, 2, 3, 5, 8, and 9, only so much of the screen of the device is shaded as is required for a proper understanding of the description.

A reference letter applied to designate a given part is used to designate such part throughout the several figures of the drawings wherever the same appears.

A is a screen consisting of a transparent or translucent plate as glass or celluloid having a series of opaque parallel bars or strips B, on the back thereof with intervening clear spaces C, C.

D, is a plate of transparent or translucent material as glass or celluloid. The several advertisements or designs on plate D, represented by the letters A, S, S, in the drawings, are placed on the front of such plate and as the several strips B, on plate A, are placed on the back of the latter plate the screen and design are in contact or substantially so.

I have found, that in order to present the same advertisement or design to an observer viewing the device from different positions, or to different observers, it is necessary to have the strips B, and the design on the plate D, in contact or very near to contact and it is for such reason that the strips B, are painted, printed or otherwise put on the back of such plate A, and the marks by means of which, (when viewed through the clear spaces C of the plate A), the desired advertisement or design is made to appear are painted, printed on or otherwise attached to the front face of the plate D.

Where plate D is made of transparent material, as glass, the plate is either painted or roughened on the back thereof, as by the sand blast or acid, to diffuse the light from lamps back thereof when, as is usually done, the advertisement, design and color scheme of the apparatus is artificially illuminated.

The several colors, as say E, F, G, Fig. 5, E′, F′, G′, Fig. 8, and E″, F″, G″, Fig. 9, by means of which the color scheme of the background is obtained, may be placed on the front or back of plate D.

To obtain the desired dissolving effect of the color scheme of the device, which is hereafter termed the rainbow effect, I find it necessary to place curved color lines as E, F, G, Fig. 5, or straight color lines as E′, F′, G′, arranged at an angle to the clear spaces C, Fig. 8, on the plate D, or to arrange such color lines straight and to make the strips B, B, and corresponding clear spaces C, C, in the screen curved, as B′, and C′, Fig. 9.

A portion of the color scheme may consist of curved lines and a portion of straight lines, arranged horizontally, perpendicularly, or inclined, and in such case if say the curved lines be placed on the plate D, outside of the lines *a*, *b*, and the straight lines be inclined and placed within such lines, a dissolving color effect will be produced upon the entire background of the advertisement or design; but the color effect outside of such lines will be so different from the effect within the lines that a border will be produced; such border remaining distinct from the body part of the background, although in both the border and body part a constant dissolving color effect appears. Where the color scheme is placed on the back of the plate D, an effect which may be termed depth is given to the background, and any movement of the observer will cause a change in the rainbow effect of the background, in addition to the change caused by the relative movement of the plates A, and D; and hence where the advertisements or designs are placed on the front of the plate D, with the color scheme on the back thereof, a very desirable result is obtained. By placing such advertisements or designs on the front and the color scheme on the back of plate D, the lines of color may extend entirely over the back plate D, without reference to the advertisements or designs on the front of such plate.

Having properly prepared the screen on the plate A, such plate is placed in frame X, so that the lines B, B, are on the back of the plate; and having properly prepared or constructed the plate D such plate is placed in frame Y, and such frame Y is mounted in frame X. The frame Y is placed in frame X so that a sliding movement may be given to such plate D, to give the desired relative change of position to the two plates.

H is an electric motor provided with worm wheel I.

J is a rotatably mounted wheel provided with teeth intermeshing with worm wheel I.

K is a cam or eccentric mounted on the shaft of wheel J to turn therewith, and L is a connection, attached by pin 1 to frame Y and arranged to engage with the cam K. Movement of the motor produces rotation of the cam and the desired movement to frame Y.

M, M, are electric lamps by means of which the advertisements or designs and the color scheme are illuminated, and *m*, *m*, are wires of the circuit in which such lamps are placed.

The lines *a*, *b*, which limit what I have hereinbefore termed the border may be oval or circular. When such lines form a circle the movement of the plate D may be around the center of the circle, as a relatively reciprocal motion is then given to the screen and the color scheme.

The strips or bars of different colors on plate D are at times curved and made to cross each other, and such crossing is shown to the left hand end of Fig. 5.

The placing of the color lines at regular intervals, and in a determined relation to each other produces different designs, when viewed through the clear spaces C, C, of plate A, and I therefore term such arrangement thereof designs.

Where the color lines are arranged in any of the different ways hereinbefore described, so that a given line of color is viewed through more than one of the clear spaces C, at a given time, there may be more lines of such color to the inch than there are clear spaces on plate A.

Having thus described my invention, what I claim as new and desire to secure by Letters Patent is:—

1. The combination of a frame and a transparent plate provided with a screen consisting of opaque lines or bars on the back face thereof, with an additional plate movably mounted back of the transparent plate, a plurality of designs on the front face of the additional plate, a color scheme consisting of bars or lines of different colors on the additional plate, such designs and such bars and lines of color respectively formed of parts which are relatively associated the same as the lines or bars forming the screen are associated, and such additional plate constructed of material which permits the passage therethrough of rays of light, means to diffuse the rays of light and means to impart movement to the additional plate; substantially as described.

2. The combination of a frame and a transparent plate provided with a screen consisting of opaque lines or bars on the back face thereof, with an additional plate movably mounted back of the transparent plate, a plurality of designs on the front face of the additional plate, a color scheme consisting of bars or lines of different colors on the additional plate, such designs and such bars or lines of color respectively formed of parts which are relatively associated the same as the lines or bars forming the screen are associated, and such color lines arranged so that a plurality of colors are exposed to view at a given time between any two of the lines or bars of the screen and such additional plate constructed of material which permits the passage therethrough of rays of light, means to diffuse the rays of light, means to impart movement to the additional plate relative to the transparent plate, and means to obtain light back of the additional plate; substantially as described.

3. The combination of a frame and a transparent plate, provided with a screen consisting of opaque lines or bars on the back face thereof, with an additional plate movably mounted back of the transparent plate, a plurality of designs on the front face of the additional plate, a color scheme consisting of a plurality of designs of different colors on the additional plate, the designs on the front of the additional plate and the color design respectively formed of parts which are relatively associated the same as the lines or bars forming the screen are associated, and such additional plate constructed of material which permits the passage therethrough of rays of light, means to diffuse the rays of light which are transmitted through the plates, means to obtain light back of the plates and means to give motion to the additional plate, substantially as described.

4. The combination of a frame and a transparent plate provided with a screen consisting of opaque lines or bars on the back face thereof, with an additional plate movably mounted back of the transparent plate, a plurality of designs on the front face of the additional plate, a color scheme consisting of a plurality of designs in different colors on the back of the additional plate, the designs on the front of the additional plate respectively formed of parts which are relatively associated the same as the lines or bars forming the screen are associated , and the color lines on the back thereof alternating in regular order, and such additional plate constructed of material which permits the passage therethrough of rays of light, and means to obtain light back of the plates and means to give motion to the additional plate, substantially as described.

5. The combination of a frame and a plate provided with a screen consisting of opaque parallel lines, with an additional plate movably mounted back of the screen, the said additional plate having a back ground composed of parallel lines of color covering the surface of said plate, said lines crossing the open spaces of the screen to give a dissolving color effect in the movement of the parts and a design independent of the background and composed of parallel opaque lines carried by said additional plate, said design caused to appear and disappear by the movement of the parts, substantially as described.

ALEXANDER S. SPIEGEL.

Witnesses:
CHARLES TURNER BROWN,
CORA A. ADAMS.